United States Patent [19]
Etienne et al.

[11] Patent Number: 5,380,433
[45] Date of Patent: Jan. 10, 1995

[54] HOLLOW FIBER MEMBRANE SEPARATION DEVICE WITH A HOUSING MADE FROM A FLEXIBLE MATERIAL

[75] Inventors: Billy J. Etienne; Wayne L. Mills, both of Newark; Bruno Leprince-Ringuet, Wilmington, all of Del.; Frederic Fillet, Vitry sur Seine, France

[73] Assignees: E. I. Du Pont de Nemours and Company, Wilmington, Del.; L'Air Liquide S.A., Paris, France

[21] Appl. No.: 69,562

[22] Filed: Jun. 1, 1993

[51] Int. Cl.⁶ .................................. B01D 63/00
[52] U.S. Cl. ..................... 210/321.79; 210/321.8; 210/321.89; 210/500.23; 96/8; 156/434; 156/69; 156/294; 264/251
[58] Field of Search ............ 210/321.78, 321.79, 210/321.8, 321.88, 321.89, 323.2, 500.23, 500.27, 450; 264/249, 251; 156/434, 69, 294; 95/45; 96/8

[56] References Cited

U.S. PATENT DOCUMENTS

| | | |
|---|---|---|
| 3,616,928 | 10/1969 | Rosenblatt . |
| 4,212,738 | 7/1980 | Henne .................. 210/321.78 |
| 4,334,993 | 6/1982 | Norton ................... 210/500.23 |
| 4,380,460 | 4/1983 | Otstot et al. . |
| 4,517,720 | 5/1985 | Otstot et al. . |
| 4,636,313 | 1/1987 | Vaillancourt ............ 210/450 |
| 4,671,875 | 6/1987 | Stookey . |
| 4,678,573 | 7/1987 | Otstot et al. . |
| 4,734,106 | 3/1988 | Gollan . |
| 4,758,341 | 7/1988 | Banner ................... 210/232 |
| 4,871,379 | 10/1989 | Edwards . |
| 5,059,374 | 10/1991 | Krueger et al. ......... 210/321.89 |
| 5,137,631 | 8/1992 | Eckman et al. ......... 210/321.8 |
| 5,211,728 | 5/1993 | Trimmer ................. 210/321.89 |

*Primary Examiner*—Robert A. Dawson
*Assistant Examiner*—Ana M. Fortuna
*Attorney, Agent, or Firm*—Cary A. Levitt

[57] ABSTRACT

The present invention is a hollow fiber separation assembly having one or more bundles of hollow fiber membranes with a tubesheet at each end enclosed by an end cap. An impermeable housing, preferably made from a flexible polymeric material, most preferably a shrinkable tubing, contacts and encloses the bundle, extending between the end caps. The polymeric, impermeable housing contacts and compacts the array of fibers in the bundle to enhance axial flow along the outside of individual fibers, protects the fiber bundle between the end caps, and contains the permeated fluid and diverts it to a port or ports at the end(s) of the bundle. This hollow fiber separation device provides a large capacity, and is also low cost, lightweight, may be used as a stand-alone separation device, and does not have a high-pressure section which requires testing.

15 Claims, 7 Drawing Sheets

HOLLOW FIBER MEMBRANE SEPARATION DEVICE WITH A HOUSING MADE FROM A FLEXIBLE MATERIAL

FIELD OF THE INVENTION

This invention relates to an apparatus for separating fluid mixtures or solutions by selective permeation. More particularly, the invention is directed to a housing for an apparatus for separating fluid mixtures, especially gas mixtures, by contact with selectively permeable hollow fiber membranes, and a process for integrating the housing into the fluid separation apparatus.

BACKGROUND

Membrane devices are used to selectively separate at least one fluid component from a mixture of fluids. Membrane devices are used in a wide variety of separation applications including reverse osmosis and gas separation. Particular gas separations of interest include the recovery of an enriched oxygen stream from air for use in enhanced combustion processes. Alternately, an enriched nitrogen stream may be obtained from air for use as an inert atmosphere over flammable fluids or for food storage. In other embodiments, nitrogen, hydrogen, helium, carbon dioxide or other organic or inorganic gases may be separated from hydrocarbons.

Different membrane device configurations suitable for fluid separations are described in the art, including plate and frame, tubular, spiral wound, and hollow fiber configurations. The hollow fiber configuration is generally preferred because a higher surface area per unit volume of device can be obtained, resulting in increased device productivity compared to other configurations.

It is known to utilize a bundle of hollow fiber membranes in which the fibers are substantially parallel and the bundles are positioned in a vessel, shell or housing for separating one fluid from a mixture of fluids by allowing the one fluid to permeate from the mixture through the walls of the hollow fiber membranes to the bores thereof, or vice versa. The hollow fiber membranes are normally made from a polymeric material. The housing is typically cylindrical.

Hollow fiber membrane separation devices are typically fabricated by parallel or bias wrapping a plurality of hollow fibers about a core. The hollow fibers are embedded in at least one tubesheet and the assembly is inserted into the housing. The tubesheet(s) sealingly engages along the inside surface of the housing so that two fluid regions are defined, commonly referred to as the shellside and the tubeside regions. The shellside region lies on the outside of the hollow fibers and is defined by the inside wall of the housing and the tubesheets which sealingly engage along the inside wall of the housing. The tubeside region lies on the inside of the hollow fibers and the housing cap. Communication between the two regions is accomplished by selective permeation of a component(s) through the membrane.

To separate a fluid mixture, such as a gas mixture, into two portions, one richer and one leaner in at least one component, the mixture is brought into contact with one side of the semipermeable hollow fiber membrane through which at least one of the gaseous components selectively permeates. A gaseous component which selectively permeates through the membrane passes through the membrane more rapidly than the other component(s) of the mixture. The gas mixture is thereby separated into a stream which is enriched in the selectively permeating component(s) and a stream which is depleted in the selectively permeating component(s). The stream which is depleted in the selectively permeating component(s) is enriched in the relatively nonpermeating component(s). A relatively nonpermeating component permeates more slowly through the membrane than the other component(s). An appropriate membrane material is chosen for the mixture at hand so that some degree of separation of the fluid mixture can be achieved.

These separation devices use the rigid housing to hold and support the bundle of hollow fiber membranes, provide a rigid assembly, provide a rigid surface to sealingly engage the tubesheet(s) and/or end caps, contain the pressurized fluid passing along the membrane outer surfaces, define the shellside region and protect the bundle of hollow fiber membranes from handling damage. Such a rigid housing may be made of a metal, plastic or composite tube, which for the particular size required may have to be machined to fit for sealing with the tubesheets. It is also possible to have a so-called "shell-less" hollow fiber permeator such as described in U.S. Pat. No. 4,871,379.

For bore-fed hollow fiber permeators, however, the fluid pressure in the shellside region is very low preferably atmospheric, so the housing need not provide the function of containing pressurized fluids.

The rigid housing also presents a problem of inserting the fibers without damage and at the same time providing a tight uniform packing within the housing to ensure efficient fluid operation. Hollow fiber membranes which are tightly packed in the permeation apparatus exhibit higher selectivity to the components in a fluid stream. This tight fit is especially difficult as different bundles do not have predictable outer dimensions. Several solutions to this packing problem have been suggested.

U.S. Pat. No. 4,361,481 describes an assembly of a sheet wrapped tightly around the bundle before inserting the assembly into the housing, and leaving the sheet in place or removing it after assembly.

U.S. Pat. No. 4,315,819 describes means for axially compacting the fiber bundles within the housing to thereby expand the bundle radially to contact the housing walls.

The devices described in the preceding paragraphs take advantage of the inherently high strength of small, thin-walled, hollow polymeric fibers. They also take advantage of the large surface area per unit volume available which results from the fact that theoretically the entire circumferential outer surface of each fiber is available for exposure to the feed fluid to be separated. However, several problems develop from such devices.

Prior art devices use a costly rigid housing extending the entire length of the permeator. The housing also adds significant weight to the device. Other low-cost permeators (U.S. Pat. No. 4,871,379) do not have individual housings at all, but instead are grouped together in a sheet-metal enclosure for collection of the permeate. They are lightweight and low cost but are not practical as stand-alone permeators. Prior art devices may also use a separate means to compact the bundle of hollow fiber membranes and to achieve countercurrent flow. Moreover, certain separation devices which have a housing that encases a high-pressure section of the permeator inlet must undergo pressure vessel testing. Results of the pressure test must be submitted to regulatory agencies. If the high-pressure inlet section of the separation device is separate from the housing, but exceeds a certain volume, testing and submission of results may also be required. Such testing and reporting adds to the cost of the unit. Therefore, there is a need for a hollow fiber separation device which provides a large capacity, but which is also low cost, lightweight, and able to be used as a stand-alone separation device, and which may use the best practice of countercurrent flow to improve efficiency.

SUMMARY OF THE INVENTION

The present invention is a hollow fiber separation assembly having one or more bundles of hollow fiber membranes with a tubesheet at each end enclosed by a rigid end cap. An impermeable housing, preferably made from a conformable polymeric material, most preferably a shrinkable tubing, consolidates and encloses the bundle, extending between the end caps. The housing is made from a flexible or nonrigid material that may conform to the contours of the bundle. The housing is tightly engaged around the bundle extending from one tubesheet to the other. Preferably, the end caps overlap a portion of the active fibers. In the preferred embodiment, the housing overlaps the tubesheet(s) and end caps to form a seal and conforms to the shape of the consolidated bundle. In particular, the end caps have a sealing fit with the tubesheets and preferably are directly connected to each other or are connected to the tubesheet or a center rod to oppose any high permeator pressure forces. The impermeable housing is low cost and lightweight, holds and supports the bundle of hollow fiber membranes, protects the fiber bundle between the end caps, contains the permeated fluid and diverts it to a port or ports at the end(s) of the bundle and preferably compacts or consolidates the array of fibers in the bundle to enhance axial flow along the outside of individual fibers. In a preferred embodiment, the discharge ports at the end of the bundle are part of the end caps.

The housing may be applied to the bundle in a variety of ways to achieve a protective, leakproof covering which radially packs the fibers in the bundle.

The assembly is particularly useful for the separation of mixtures of fluids, especially gases, using so-called bore side flow. This hollow fiber separation device provides a large capacity, and is also low cost, lightweight, may be used as a stand-alone separation device, and does not have a high-pressure housing which requires testing.

DETAILED DESCRIPTION OF THE INVENTION

Figure 1:
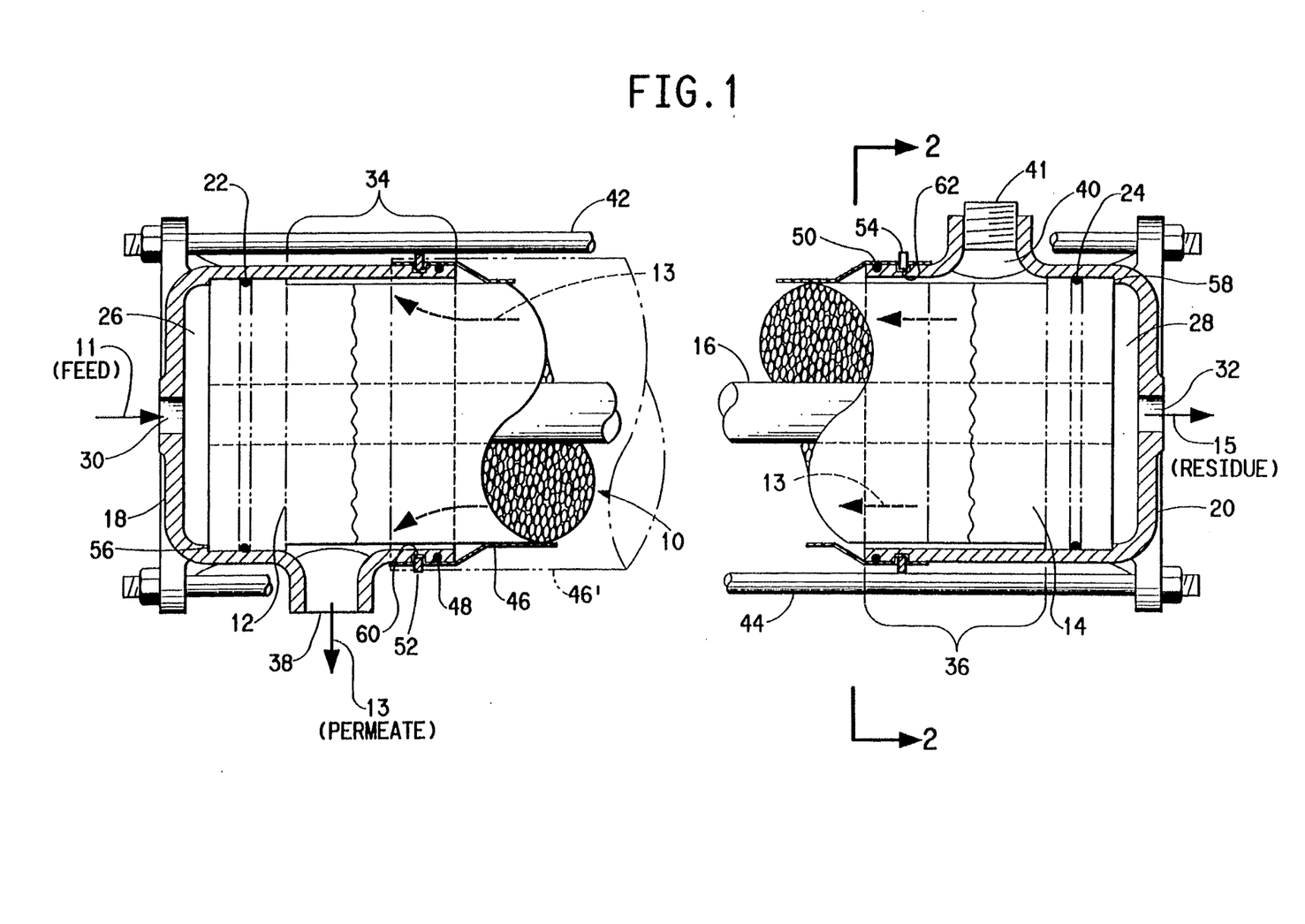
FIG. 1 shows the separation device in partial cross section with a standard double-ended tubesheet, fiber bundle and a housing made from a nonrigid or flexible material.
Figure 2:
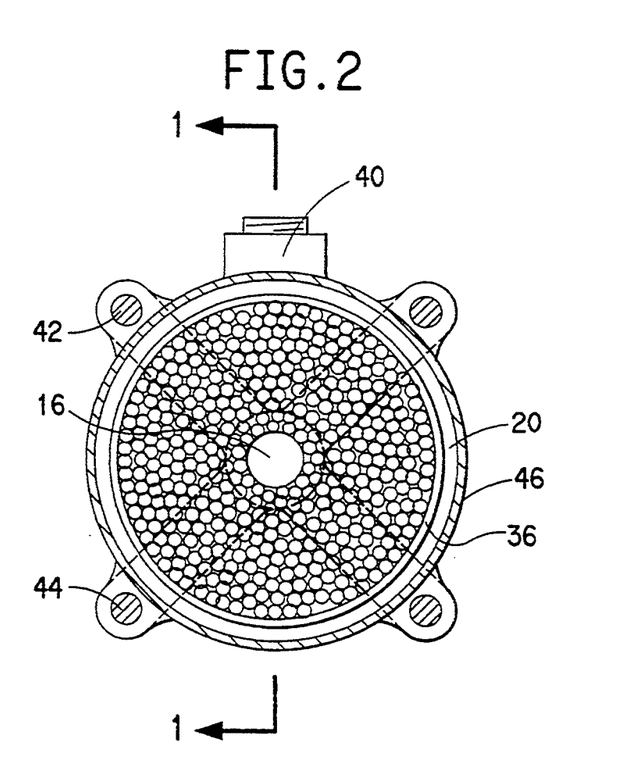
FIG. 2 is an end view of the separation device shown in FIG. 1.

A preferred separation device of the invention is shown in FIGS. 1 and 2. It consists of a bundle of hollow fiber membranes 10 having tubesheets 12 and 14 at the ends, and a tubular center support shaft 16 to tie the tubesheets together and provide a rigid "backbone" to the bundle. End caps 18 and 20 surround the ends of the bundle and sealingly engage the tubesheets, such as at "O-rings" 22 and 24, and define a chamber 26 and 28 in fluid communication with the open bores of the hollow fiber membranes at the ends of the tubesheets, and have a first port in each cap, such as ports 30 and 32. The end caps also preferably provide a circumferential clearance with the bundle 10 that forms a channel, such as channel 34 and 36, around the end of the bundle near where the loose active fibers enter each tubesheet. This overlap of the end cap with the interface of the tubesheet and active portion of the fibers protects the fibers at the interface from handling damage because this interface is a high-stress area for the fibers. The channels 34 and 36 are in fluid communication with second ports 38 and 40 which are part of the end caps. The end caps are preferably fixedly connected to each other by tie-rods, such as 42 and 44 so that operating pressure in chambers 26 and 28 will not force the caps off the ends of the tubesheets, and to act as bumpers that provide additional protection to the bundle during handling. A housing 46 covers the tube bundle between the end caps and sealingly engages the end caps, such as at "O-rings" 48 and 50.

The housing 46 is impermeable to the fluids being separated. It may be fabricated from a variety of materials that are flexible or nonrigid and/or may be able to consolidate the bundle and conform to the shape of the bundle. Suitable materials include a polymeric material, preferably a flexible polymer sheet that can form a sealed tubular structure about the hollow fibers, most preferably a shrinkable polymeric material. The housing may also be made from an impermeable cloth or fabric (woven or nonwoven), metals, including foil, and paper or like materials. The tubular structure can be an extruded cylinder or it can be a wrapped sheet or strip which is seamed to form the tubular structure. The seam can be a butt seam, overlap seam or a spiral seam or the like. If a seamed tubular structure is used, the seam can be made before or after enclosing the hollow fibers.

"Shrinkable material" means a material that can elastically or plastically decrease at least one surface dimension to a stable value by removal of a stretching force, application of a compressive force, or by a controlled chemical, thermal, or radiation induced changes in the structure of the polymeric material. Preferably, the shrinkable material is a polymeric shrink-tube. Suitable shrinkable polymeric materials include polyester such as Mylar polyester, polyamide, polypropylene, irradiated polypropylene, polyolefin such as Hypalon polyolefin, polyvinyl chloride (PVC), neoprene, polyurethane, silicon, ethylene propylene diene monomer (EPDM), fluoroelastomer with halogen polymers (Viton), or the like. The housing is lightweight and inexpensive, but advantageously maintains all of the beneficial properties of prior art devices. Moreover, after the housing has been formed from the flexible material which may consolidate and conform to the bundle, it need not be flexible or nonrigid. For example, after shrinking, certain polymeric materials are relatively rigid and dimensionally stable which further protects the fibers from damage during handling and operation.

In FIG. 1, the material of the housing 46 is preferably a polymeric shrink-tube that is shrinkable, for instance, by thermal or chemical means, and is preferably compatible with the permeator bundle and the fluids used in the permeator. Clamps, such as 52 and 54, may be used to enhance the sealing and attachment of the shell 46 to the end caps. FIG. 2 shows an end view of the permeator.

When assembling the separation device of FIGS. 1 and 2, the following steps are preferably followed:

(a) the tube bundle with center shafts and tubesheets at each end is fabricated using known "jelly roll" techniques to make a double-ended hollow fiber tube bundle, which is preferably substantially cylindrical;

(b) the tubesheets are machined to size and to open the hollow fiber ends;

(c) one end cap is placed on one end of the bundle and held with a shoulder, such as 56, engaging the end of the tubesheet;

(d) an impermeable housing (shown in phantom as 46') preferably made from a shrinkable polymeric tube, is placed over the tube bundle and over the open end of the end cap that is in place;

(e) to accommodate any axial shrinkage of the flexible housing, the tube is shrunk from the center toward the first end cap and along the bundle to a point near the opposite end of the bundle, before placing the second end cap in place;

(f) a second end cap is placed on the other end of the bundle and the open end of the cap is placed inside the housing;

(g) four tie-rods are put in place between the two end caps, and the end caps are drawn toward each other until the tubesheet engages shoulders 56 and 58 on the end caps;

(h) in the case of a heat shrinkable polymeric housing, the housing is heated further, such as with a surrounding flame or radiant heat source, or a hot-air gun or oven until the polymer housing shrinks tightly around the tube bundle and the open end of the end caps, thereby conforming to the bundle and the end caps and consolidating or squeezing the fibers in the bundle together and engaging the seals 48 and 50. It may be necessary to avoid excess heat to prevent damage to the hollow fibers; and (i) auxiliary clamps 52 and 54 are put in place to squeeze the shrunken shell tightly into grooves 60 and 62 in the end caps to provide additional sealing and attachment between the housing and the end caps.

Other assembly steps are possible to accommodate the particular shrinkage characteristics of the tube and the particular design of the end caps and the manner of retaining them. If there is no significant axial shrinkage during the radial shrinkage of the shrinkable tube, the two step shrinkage may not be required and the entire tube can be shrunk after both end caps are installed. In such case an oven may conveniently be used to apply shrinkage heat to the tube.

In a preferred use, a feed fluid 11 would enter through port 30 and thence into chamber 26, through tubesheet 12, and through hollow fiber bundle 10. A portion of the feed fluid would permeate through to the outside surfaces of individual hollow fibers in the bundle, thereby becoming a permeate stream 13, and the residual portion, or residue stream 15, would pass through tubesheet 14 to chamber 28 and would leave the separation device through port 32. The permeate 13 on the outside of the individual fibers travels along the outer surfaces of the fibers both radially and axially and enters channel 34 at the end cap near the tubesheet at the inlet end of the bundle. From the channel 34, the permeate 13 would flow out of the separation device through port 38 in end cap 18. The axial flow of the permeate occurs close to the outer surface of the individual hollow fibers because the fibers are held closely together by the tightly fitting housing and the lowest pressure passages through the fibers would occur where the cylindrical fiber surfaces come together and leave axial passages. Preferably, there is only one outlet port for permeate, such as port 38, so the axial flow would all occur in a counterflow direction to the feed fluid. This aids in the efficient operation of the separation device. Compared to devices with no means of consolidating or squeezing the bundle of fibers together, the separation device of the invention can be expected to provide higher selectivity.

Alternatively to the counterflow arrangement, an additional port 40 (shown capped with plug 41) could be provided in end cap 20 to allow flow of permeate 13 in both directions in the bundle for a lower pressure drop in the permeate flow, or for providing a sweep fluid that may enter at port 40 and exit at port 38. The end caps 18 and 20 preferably are six inches or less in diameter so they would not have to be tested as pressure vessels. The volume of chambers 26 and 28 may be minimized to avoid large volume testing regulations in some countries; the small volume chambers enclosed by the caps also keeps the weight of the caps down. The accommodation by the separation device of the invention to these pressure testing considerations results in a lower cost, lighter weight separation device than can be found in prior art.

Figure 7A:
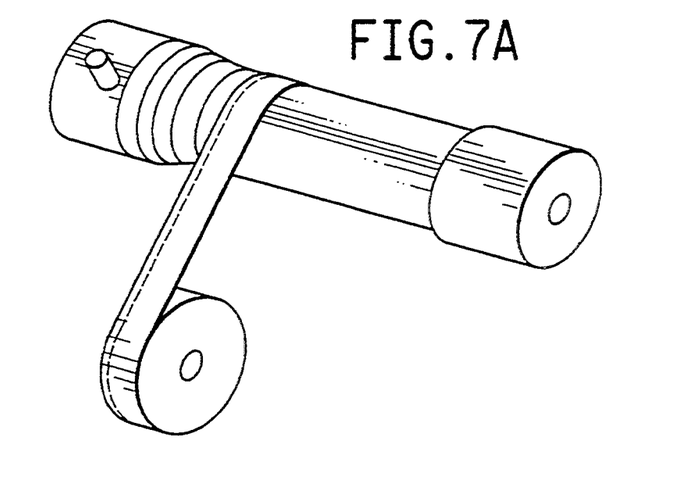
FIGS. 7A, 7B and 7C shows three methods for assembling the housing and the bundle of membranes.
Figure 7B:
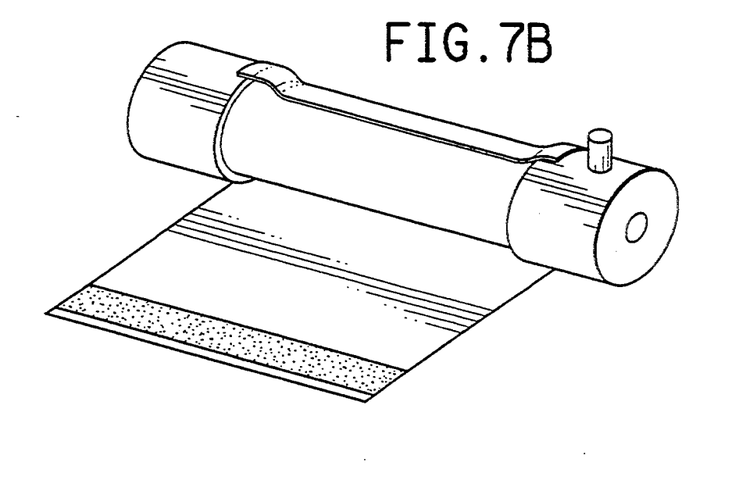
Figure 7C:
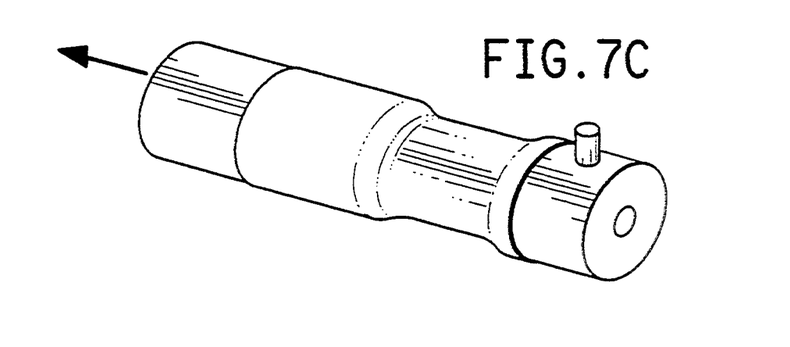

The flexible material used to form the housing can be applied to the bundle in a variety of ways to achieve a protective leakproof impermeable covering and efficient radial packing of the fibers in the housing. The flexibility of the housing material permits it to be assembled to the bundle by several methods, for example:

(a) providing a flexible adhesive coated or self-sealing strip that is spirally wrapped under tension about the bundle and end caps as shown in FIG. 7A;

(b) providing a flexible sheet that is circumferentially wrapped under tension around the bundle and end caps and sealed with adhesive at the overlap as shown in FIG. 7B;

(c) providing a flexible, tubular material that can be elastically expanded and placed over the bundle and end caps and then be released to elastically contract and compact the bundle as shown in FIG. 7C; or (d) providing a flexible, shrinkable material that can be placed over the bundle and end caps and then be shrunk to compact the bundle as in FIG. 1. The housing can be formed from a tubular material, sheet or self-sealing strip.

Figure 3:
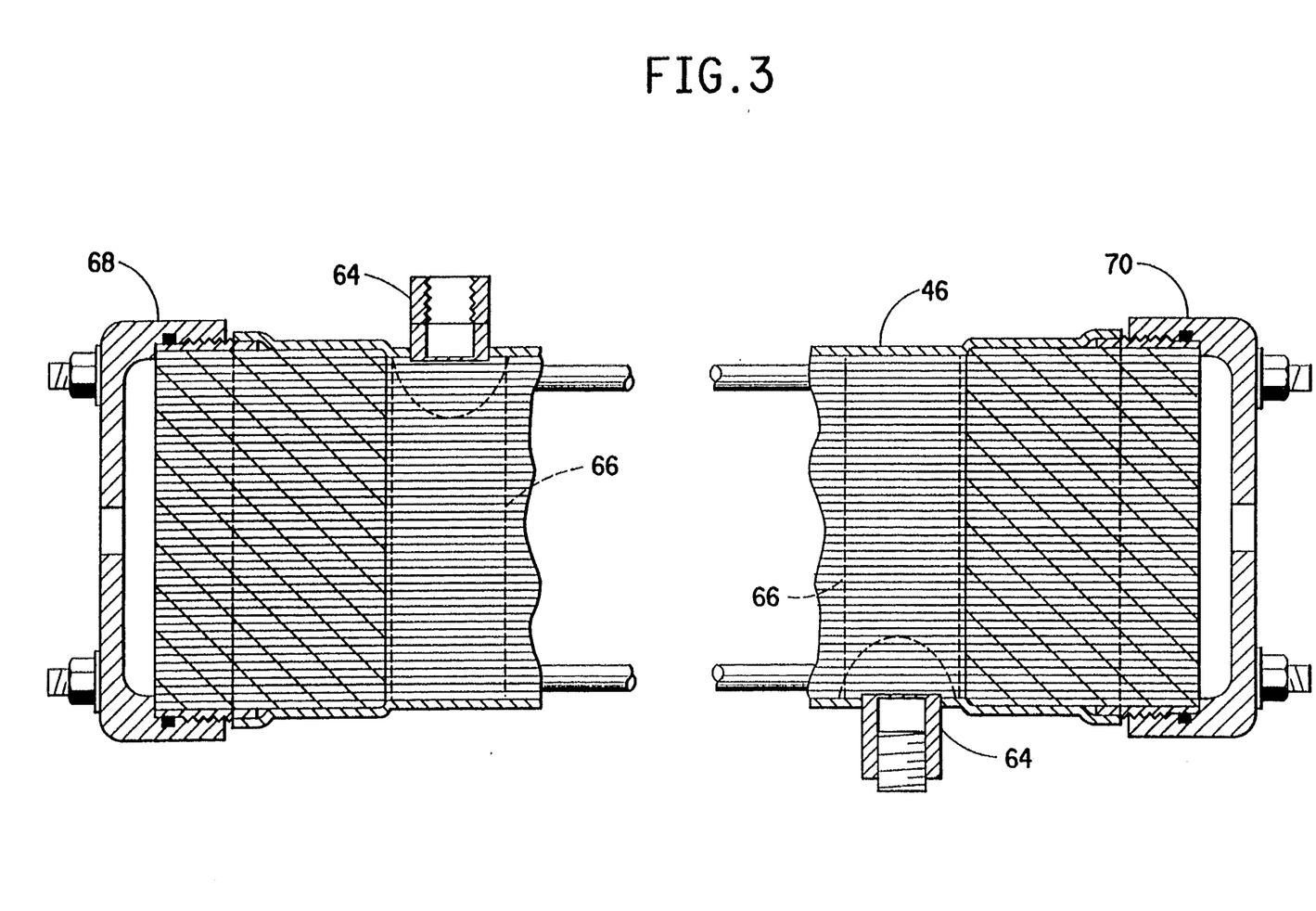
FIG. 3 shows an alternate embodiment of the separation device in partial cross section without a center support rod, and using saddle-type fittings for the ports and simplified end caps.

Other variations of separation device are possible that use the shrinkable polymeric housing. FIG. 3 shows an embodiment where the center support rod is eliminated and the end caps are directly held to each tubesheet by threaded connections to resist the pressure forces within the end caps. The tie-rods are retained to provide structural rigidity to the assembly and act as bumpers to protect the bundle during handling. They may be eliminated without compromising the functionality of the device. The outlet ports for the permeate may be saddle-type fittings 64 that are held in place by the housing 46; an adhesive such as silicone or the like could be used to seal the saddle fitting to the housing. The saddle fitting could be the same material as the polymeric housing and it could be attached by vulcanizing or thermal bonding. Open-cell foam inserts, such as 66, between the saddle fitting and the hollow fiber bundle may be used to cushion the contact with the saddle and to provide flow paths around the bundle and under the saddle. In this variation, simpler end caps 68 and 70 are used without outlet ports and the housing is shrunk around the tubesheet at the ends of the apparatus.

Figure 4:
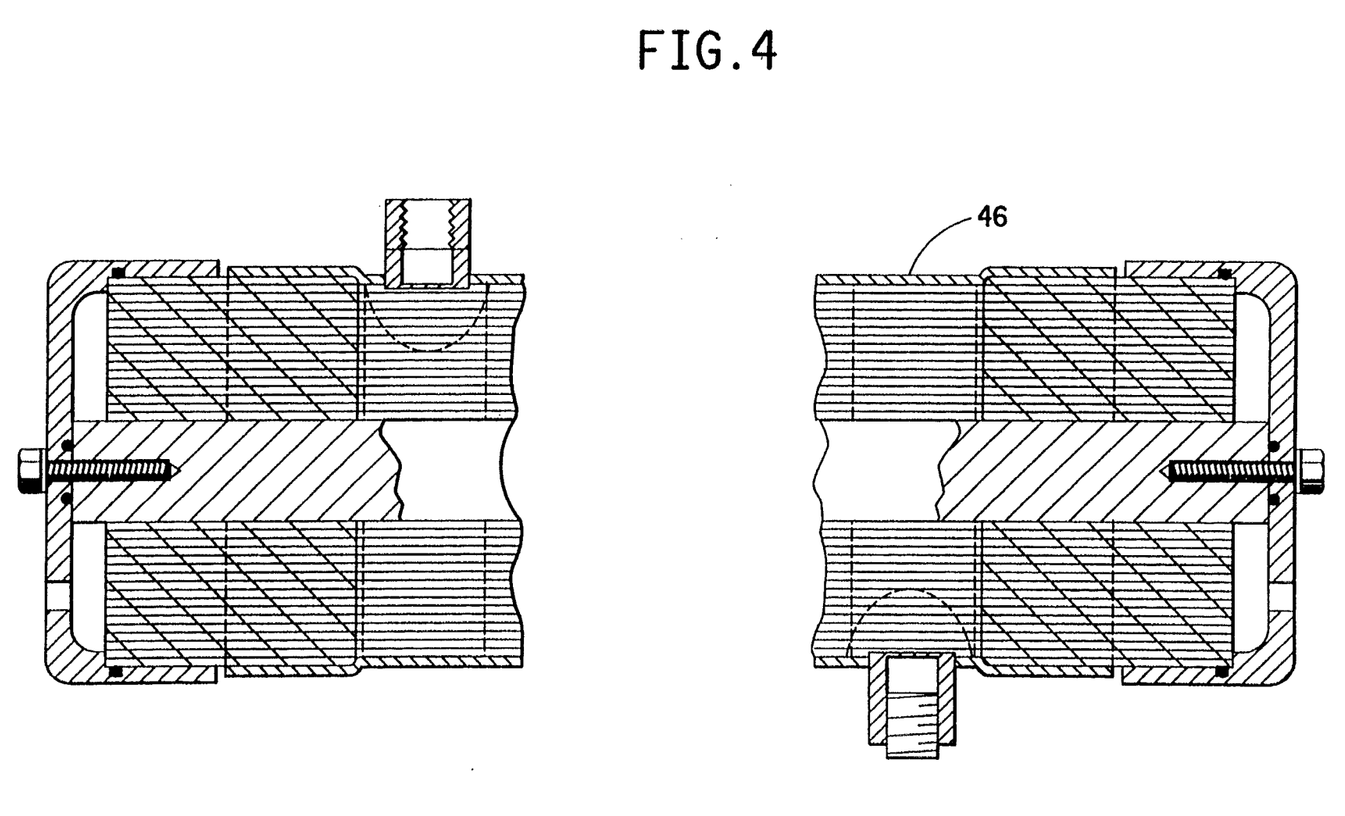
FIG. 4 shows an alternate embodiment of the device shown in FIG. 1 using saddle-type fittings for the ports and simplified end caps.

FIG. 4 shows another variation of the center shaft structure of FIG. 1 which uses the saddle-type fitting of FIG. 3. The end caps can be affixed to the center shaft with bolts, as shown, or other attachment means. In another variation, the end caps 18 and 20 of FIG. 1 could be modified slightly to move ports 30 and 32 off-center so the caps (including ports 38 and 40) could alternatively be attached to the center rod 16 of FIG. 1 in a manner similar to what is shown in FIG. 4.

Figure 5:
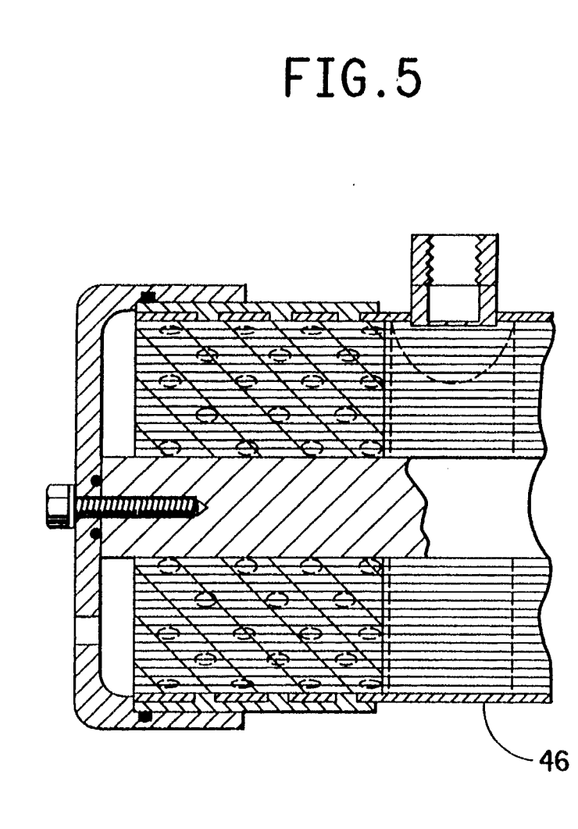
FIG. 5 shows the end of the separation device having a shrinkable housing covering the ends of hollow fiber membranes and the tubesheet polymer flows into holes in the ends of the housing.

FIG. 5 shows a variation of FIG. 4 where the impermeable housing 46 is shrunk in place during fabrication of the bundle and the tubesheet resin flows into holes in the ends of the housing to securely attach and seal the housing to the tubesheets. The end caps fit over the ends of the housing and tubesheet.

The housing can extend from one tubesheet to the other and sealingly engage the tubesheet with the end caps overlapping the housing material, or the housing can extend from one end cap to the other and sealingly engage the end cap by overlapping the end cap with the housing. In any case, the housing and end caps are preferably in an overlapping arrangement. The end caps preferably form a chamber at the end of the tubesheet, form a seal with the tubesheet, and overlap the tubesheet; frequently, but not always, the seal is formed at the overlapped portion. In FIG. 5, the housing also overlaps the tubesheet and additional tubesheet potting material covers the housing at the overlap; in this case, the housing has become an integral part of the tubesheet so the end cap still overlaps the tubesheet and the housing.

The present invention may advantageously be used with a variety of configurations of separation devices, tubesheets and membranes. The configuration of the separation device and the tubesheet contained therein are well known. The cross-sectional configuration (i.e., the configurations lying in a plane perpendicular to the longitudinal orientation of the hollow fiber membranes) of tubesheets is usually generally circular. It is also apparent that the cross-sectional configuration may be in any other form such as triangular, trilobal, square, rectangular, trapezoidal, pentagonal, hexagonal, free form, or the like. The shrinkable housing should conform to the selected cross-sectional configuration of the tubesheet and bundle. The face of the tubesheet may be any suitable configuration and is generally substantially the same configuration as the cross-sectional configuration of the tubesheet, as when cut perpendicular to it. The face may be substantially flat or may be curved or irregular in surface contour. The tubesheet may contain one or more bundles of hollow fiber membranes.

Figure 6:
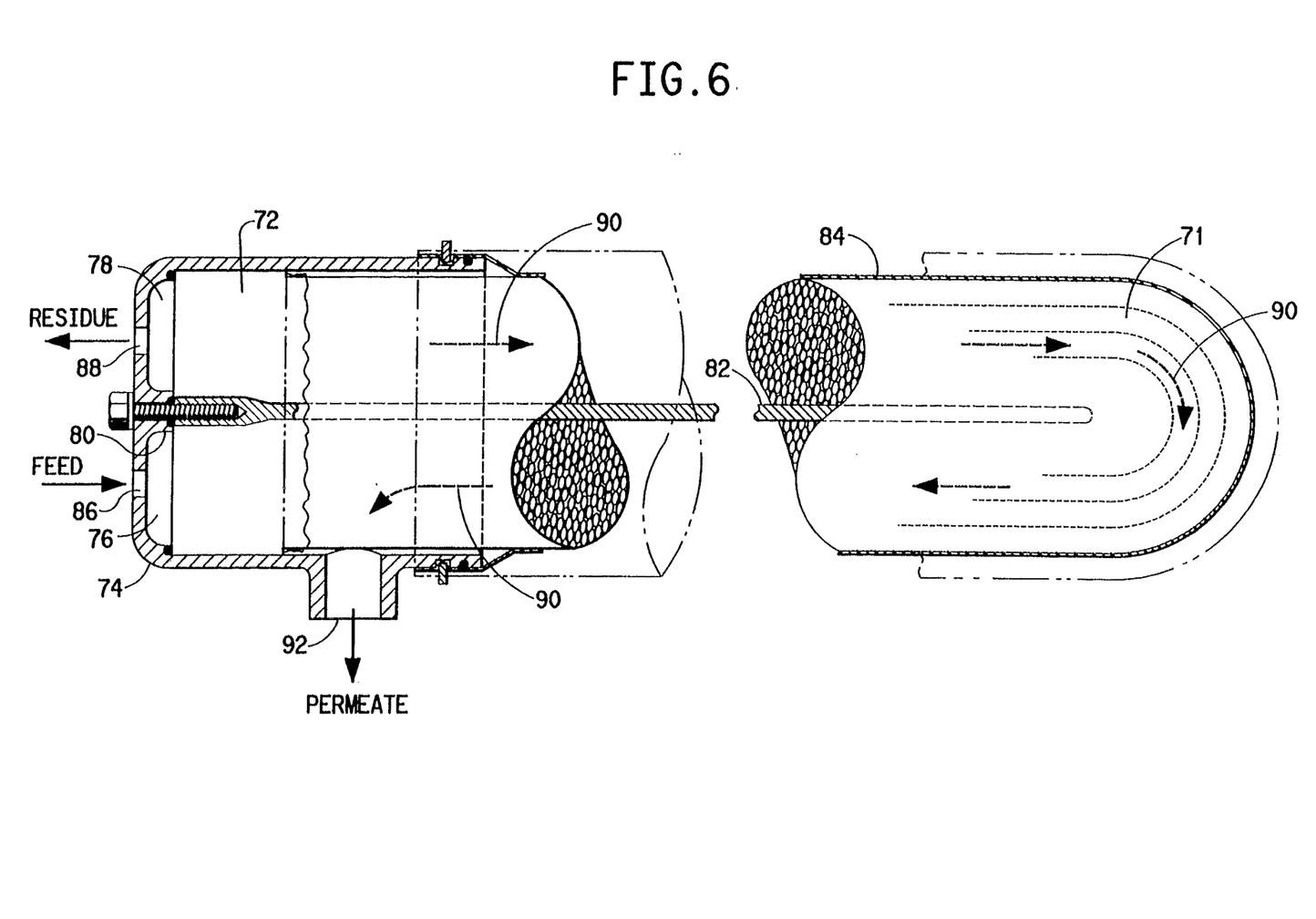
FIG. 6 shows an alternate embodiment of the device wherein the membrane bundle is "U" shaped with a partitioned tubesheet at one end.

FIG. 6 shows an alternate configuration of the invention where the tube bundle 71 is in a U-shape with a partitioned tubesheet 72 at one end. The end cap 74 enclosing the partitioned tubesheet is similarly partitioned to provide two chambers 76 and 78 separated by a barrier 80. One chamber is in fluid communication with one portion of the tubesheet and the other chamber is in fluid communication with another portion of the partitioned tubesheet. There is a bundle divider 82 extending from the tubesheet along the center of the U-shape defined by the bundle to the bottom of the "U". The bundle housing 84 is a closed end flexible tube, preferably made from a shrinkable polymeric tube, that encloses the U-shaped bundle at the closed end and engages the dual chamber end cap 74 at the open end of the tube. The housing also engages opposed edges of the bundle divider to form a flow restriction along the length of the divider.

In operation, the feed fluid enters the one chamber 76 of the end cap at an entrance port 86 and flows into the hollow fibers at the one portion of the tubesheet. The fluid exits the tube bundle as a residue at the other portion of the tubesheet and enters the other chamber 78 of the partitioned end cap and the residue exits the chamber at an exit port 88. The permeate 90 passing through the walls of the U-shaped bundle flows along the outside of the hollow fibers from the exit end of the divided bundle until it reaches the end of the "U" and then it flows toward the entrance end of the bundle. At the entrance end, the permeate flows out of the housing through a permeate port 92, shown in this case, in the side of the end cap.

This variation of a separation device thus comprises: (a) a bundle of hollow fibers having open bores in a first tubesheet (one portion) and open bores in a second tubesheet (other portion); (b) said tubesheets each being enclosed by an end cap (one and the other chambers); and (c) a housing made from a suitable material, substantially impermeable to the fluids being treated, contacting and enclosing the bundle and extending between the end caps (one and the other chambers), said housing being sealingly in contact with (the tubesheet or) the end caps.

The potting material to form the tubesheet may be comprised of any suitable material that is compatible with the selected shrinkable housing material that may contact it. The hollow fiber membranes may be any configuration and may be comprised of any suitable material that is compatible with the selected housing material that may contact them. The tubesheet and hollow fiber membranes do not otherwise limit the scope of the invention.

We claim:

1. A hollow fiber separation device comprising:
   (a) a bundle of hollow fiber membranes having open bores in one or more tubesheets;
   (b) at least one of said tubesheet or tubesheets being enclosed by an end cap; and
   (c) a flexible housing made from a polymeric shrinkable material, substantially impermeable to the fluids being treated, contacting and enclosing the bundle and extending between the ends of the bundle, said housing being sealingly in contact with the tubesheet(s) or the end cap(s) or both, at each end of the bundle.

2. The separation device of claim 1 in which the polymeric material is selected from the group of polyesters, polyamides, polypropylenes, polyolefins, polyvinylchlorides, polyurethanes, silicones, ethylene propylene dienes, fluoroelastomers or fluoroelastomers with halogen.

3. The separation device of claim 1 in which the polymeric shrinkable material contacts and consolidates the bundle.

4. The separation device of claim 1 in which the shrinkable material is a shrink-tube.

5. The separation device of claim 1 in which the device is a gas separation device and the housing is substantially impermeable to gaseous fluids.

6. The separation device of claim 1 further comprising:
  (a) means for introducing a fluid mixture into the device so as to produce a permeate portion passing through the membranes and a nonpermeate portion which does not pass through the membranes;
  (b) means for removing the nonpermeate portion of the fluid mixture from the device; and
  (c) means for removing the permeate portion of the fluid mixture from the device.

7. The separation device of claim 1 wherein the end cap enclosing one tubesheet has a port in fluid communication with the outer surface of the fiber bundle and has a circumferential channel in fluid communication with the port and extending around the fiber bundle, and the housing is in sealing contact with the channel in said end cap.

8. The separation device of claim 1 in which the housing, tubesheet(s) and end cap(s) are in overlapping relation.

9. The separation device of claim 1 further comprising one or more tie rods fixedly connected to the end caps.

10. A process for assembling a separation device comprising:
  (a) fabricating a bundle of hollow fiber membranes with one or more tubesheets;
  (b) machining the tubesheets to open the ends of the hollow fiber membranes;
  (c) pacing an end cap having an open end over at least one tubesheet; and
  (d) placing a flexible housing made of an impermeable material over the bundle and over the open end of the end cap, said material being a polymeric shrinkable material.

11. The process of claim 10 further comprising placing a second end cap over the open end of the bundle and within the housing.

12. The process of claim 10 in which the impermeable material is caused to shrink into contact with the bundle and sealingly engage the end caps or the tubesheets.

13. The process of claim 10 wherein placing the impermeable material over the bundle consolidates the bundle to decrease the bundle circumference.

14. The process of claim 10 wherein said impermeable material is a shrink-tube.

15. The process of claim 14 wherein the shrink-tube overlaps the end caps and said shrink-tube is caused to shrink thereby sealingly engaging the end caps.

* * * * *